(12) United States Patent
Li et al.

(10) Patent No.: US 7,502,329 B2
(45) Date of Patent: Mar. 10, 2009

(54) DISTRIBUTED NETWORK MONITORING WITH BOUNDED LINK UTILIZATION IN IP NETWORKS

(75) Inventors: Li Li, Iselin, NJ (US); Sanjoy Paul, Marlboro, NJ (US); Marina K. Thottan, Westfield, NJ (US); Bin Yao, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1106 days.

(21) Appl. No.: 10/351,913

(22) Filed: Jan. 27, 2003

(65) Prior Publication Data

US 2004/0146065 A1 Jul. 29, 2004

(51) Int. Cl.
*H04L 12/28* (2006.01)
*H04L 12/403* (2006.01)
*H04J 3/16* (2006.01)
*G06F 15/173* (2006.01)

(52) U.S. Cl. .................. 370/252; 370/346; 370/449; 709/224

(58) Field of Classification Search .......... 370/252, 370/254, 255, 346; 709/224
See application file for complete search history.

(56) References Cited

U.S. PATENT DOCUMENTS

| | | | | |
|---|---|---|---|---|
| 4,771,423 A | * | 9/1988 | Ohya et al. | 370/437 |
| 6,101,550 A | * | 8/2000 | Zucker | 709/241 |
| 6,469,986 B1 | * | 10/2002 | Lecheler et al. | 370/252 |
| 6,564,341 B1 | * | 5/2003 | Sundaram et al. | 714/43 |
| 6,792,455 B1 | * | 9/2004 | DeLuca et al. | 709/224 |

OTHER PUBLICATIONS

Li et al., "Distributed network monitoring with bounded link utilization in IP networks", Mar. 30-Apr. 3, 2003, INFOCOM 2003. Twenty-Second Annual Joint Conference of the IEEE Computer and Communications Societies. IEEE, vol. 2, pp. 1189-1198 vol. 2.*
S. Jamin et al., On the Placement of Internet Instrumentation, In Proceedings of IEEE Infocom 2000.
Y. Breitbart, et al., Efficiently Monitoring Bandwidth and Latency in IP Networks, In Proceedings of IEEE Infocom, 2001.
A. Liotta, Towards Flexible and Scalable Distributed Monitoring with Mobile Agents, PhD Thesis—University College London, London, UK, Jul. 2001.

* cited by examiner

*Primary Examiner*—Firmin Backer
*Assistant Examiner*—Nittaya Juntima

(57) ABSTRACT

A method and apparatus for optimizing a distributed polling system in a network comprising a plurality of nodes. The method includes identifying bandwidth constraints on polling traffic for each of the plurality of nodes. Selecting, from a plurality of unpolled nodes within the plurality of nodes, at least one poller node according to a maximum number of unpolled nodes assignable to each of the at least one poller node without violating bandwidth constraints, and respectively assigning the unpolled nodes as pollee nodes to the at least one poller node. The apparatus includes a central manager and a plurality of pollee nodes coupled to at least one poller node via at least one routing path. At least one aggregating node is coupled to the at least one poller nodes, where the aggregating node is further coupled to the central manager.

15 Claims, 13 Drawing Sheets

|  | Link Type | | |
|---|---|---|---|
|  | 1 | 2 | 3 |
| Tier 3 | OC48 | OC3 | OC12 |
| Tier 2 | OC48 | OC12 | OC12 |
| Tier 1 | OC192 | OC48 | OC48 |

TABLE 1

|  | Link Fraction for Polling | Number of Nodes | |
|---|---|---|---|
|  |  | 200 | 400 |
| HmaxLoad | 5% | (15±3, 0.91%) | (32±7, 0.85%) |
|  | 10% | (7±3, 1.50%) | (16±2, 1.38%) |
| HmaxPollee | 5% | (6±2, 0.94%) | (15±4, 0.97%) |
|  | 10% | (2±1, 1.45%) | (6±2, 1.33%) |
| Random | 5% | (13±2, 0.84%) | (29±2, 0.89%) |
|  | 10% | (6±1, 1.33%) | (13±4, 1.35%) |

TABLE 2
PERFORMANCE OF HEURISTIC ALGORITHMS FOR TIER 2 SERVICE PROVIDER NETWORKS. EACH TUPLE IS (NUMBER OF POLLERS REQUIRED WITH VARIANCE, FRACTION OF TOTAL BANDWIDTH USED.)

|  | Link Fraction | Number of Nodes | |
|---|---|---|---|
|  |  | 100 | 200 |
| shuffle | 5% | (6±2, 0.94%) | (15±4, 0.97%) |
|  | 10% | (2±1, 1.45%) | (6±2, 1.33%) |
| no shuffle | 5% | (7±5, 1.21%) | (20±9, 1.32%) |
|  | 10% | (2±1, 1.55%) | (6±3, 1.76%) |

TABLE 3
EFFECT OF POLLEE SHUFFLE USING HmaxPollee

FIG. 9A

|  | Link Fraction | Number of Nodes | |
|---|---|---|---|
|  |  | 200 | 400 |
| HmaxLoad | 5% | (42±8, 0.66%) | (89±13, 0.59%) |
|  | 10% | (23±5, 1.25%) | (53±7, 1.13%) |
| HmaxPollee | 5% | (27±3, 0.89%) | (65±10, 0.75%) |
|  | 10% | (12±5, 1.53%) | (29±7, 1.36%) |
| Random | 5% | (44±4, 0.73%) | (101±10, 0.69%) |
|  | 10% | (22±5, 1.22%) | (51±9, 1.31%) |

TABLE 4

PERFORMANCE OF HEURISTIC ALGORITHMS FOR TIER 3 SERIES PROVIDER NETWORKS

|  | Link Fraction | Number of Nodes | |
|---|---|---|---|
|  |  | 200 | 400 |
| HmaxLoad | 5% | (3±1, 0.41%) | (7±1, 0.56%) |
|  | 10% | (2±0, 0.43%) | (4±2, 0.62%) |
| HmaxPollee | 5% | (1±0, 0.40%) | (1±0, 0.49%) |
|  | 10% | (1±0, 0.40%) | (1±0, 0.54%) |
| Random | 5% | (3±1, 0.42%) | (6±1, 0.49%) |
|  | 10% | (2±1, 0.46%) | (3±0, 0.58%) |

TABLE 5

PERFORMANCE OF HEURISTIC ALGORITHMS FOR TIER 1 SERIES PROVIDER NETWORKS

|  | Link Fraction | Number of Nodes | |
|---|---|---|---|
|  |  | 100 | 200 |
| HmaxLoad | 5% | (10±4, 1.38%) | (9±2, 0.74%) |
|  | 10% | (5±1, 1.82%) | (4±1, 0.81%) |
| HmaxPollee | 5% | (6±1, 1.63%) | (5±0, 0.79%) |
|  | 10% | (3±1, 1.72%) | (3±0, 0.82%) |
| Random | 5% | (12±1, 1.49%) | (10±2, 0.78%) |
|  | 10% | (5±1, 1.87%) | (5±1, 0.84%) |

TABLE 6

PERFORMANCE OF HEURISTIC ALGORITHMS FOR ENTERPRISE NETWORKS (100 NODES: WAXMAN $\alpha = .2$, $\beta = 0.15$)

FIG. 9B

|            | Link Fraction | β            |              |              |              |              |
|------------|---------------|--------------|--------------|--------------|--------------|--------------|
|            |               | 0.08         | 0.1          | 0.15         | 0.18         | 0.2          |
| HmaxPollee | 5%            | (9, 1.72%)   | (8, 1.35%)   | (5, 0.73%)   | (5, 0.58%)   | (4, 0.57%)   |
|            | 10%           | (4, 2.03%)   | (3, 1.52%)   | (3, 0.75%)   | (2 0.62%)    | (2, 0.56%)   |

TABLE 7
PERFORMANCE OF HmaxPollee ENTERPRISE NETWORKS
(200 NODES: WAXMAN $\alpha = .2$)

|            | Link Fraction | Number of Nodes |              |
|------------|---------------|-----------------|--------------|
|            |               | 200             | 400          |
| HmaxPollee | 5%            | (7, 0.70%)      | (18, 0.91%)  |
|            | 10%           | (2, 1.62%)      | (7, 1.43%)   |
| LP bound   | 5%            | (2, 0.52%)      | (-, -)       |
|            | 10%           | (1, 1.24%)      | (-, -)       |

TABLE 8
COMPARISON OF HMaxPollee WITH LP LOWER BOUND: TIER 2
SERVICE PROVIDER NETWORKS

|            | Link Fraction | Number of Nodes       |                       |
|------------|---------------|-----------------------|-----------------------|
|            |               | 100 ($\beta = 0.15$)  | 200 ($\beta = 0.08$)  |
| HmaxPollee | 5%            | (6, 1.79%)            | (9, 1.72%)            |
|            | 10%           | (4, 1.65%)            | (4, 2.03%)            |
| LP bound   | 5%            | (1, 1.02%)            | (1, 0.99%)            |
|            | 10%           | (1, 1.24%)            | (1, 1.38%)            |

TABLE 9
COMPARISON OF HmaxPollee WITH LP LOWER BOUND: ENTERPRISE
NETWORKS

FIG. 9C (a) LINKF=5%

(b) LINKF=10%

Minimum number of Pollees as a function of Network Size

DISTRIBUTED NETWORK MONITORING WITH BOUNDED LINK UTILIZATION IN IP NETWORKS

FIELD OF INVENTION

The present invention relates to network management. More specifically, the present invention relates to optimizing a scalable distributed polling system.

DESCRIPTION OF THE BACKGROUND ART

Accurate network measurement is essential for understanding network behavior and for providing Quality of Service (QoS) guarantees. Most commercial network management software utilizes the Simple Network Management Protocol (SNMP) as the primary method for data collection. Using SNMP involves running SNMP agents on network devices, where an SNMP manager polls these devices for management information.

SNMP-based polling systems have an inherent overhead in terms of processing load on network nodes and network bandwidth consumption. This overhead is further exaggerated when network devices are polled at a high frequency. Such frequent polling is vital for providing QoS guarantees and failure detection. There is a considerable amount of work being done to improve SNMP protocol by reducing the CPU load on the network node. For example, work has been done both to improve SNMP primitives as well as to design better polling strategies by batching SNMP requests. On the other hand, not much research has been done to reduce network bandwidth consumption. Bandwidth is a revenue generating resource and, therefore, service providers are reluctant to allocate large amounts of valuable bandwidth for network management purposes. Thus, bandwidth constraint for network monitoring is an essential design criteria for any measurement infrastructure.

In a centralized measurement system where all network nodes are monitored from a central manager, poll responses are forwarded to a central location in the network. This provides a network-wide view, but creates a potential for bandwidth bottleneck on links that are close to the central manager. On the other hand, in a distributed measurement system the polling load is shared among multiple pollers located at different points in the network. However, using distributed pollers typically increases the cost of network management in terms of the number of pollers deployed, as well as suffers from the lack of a network-wide view.

Accordingly, a method of optimizing a scalable distributed polling system is desirable to reduce the costs of deployment of the measurement infrastructure at an economy of scale.

SUMMARY OF THE INVENTION

The disadvantages heretofore associated with the prior art, are overcome by the present invention of a method and apparatus for optimizing a distributed polling system in a network comprising a plurality of nodes. The method includes identifying bandwidth constraints on polling traffic for each of the plurality of nodes. Selecting, from a plurality of unpolled nodes within the plurality of nodes, at least one poller node according to a maximum number of unpolled nodes assignable to each of the at least one poller node without violating bandwidth constraints, and respectively assigning the unpolled nodes as pollee nodes to the at least one poller node.

The apparatus includes a central manager and a plurality of pollee nodes coupled to at least one poller node via at least one routing path. At least one aggregating node is coupled to the at least one poller nodes, where the aggregating node is further coupled to the central manager.

BRIEF DESCRIPTION OF THE DRAWINGS

The teachings of the present invention can be readily understood by considering the following detailed description in conjunction with the accompanying drawings, in which:

FIGS. 9A-9C each depict three tables providing various comparison information regarding the heuristic methods of FIGS. 3, 6, and 7;

To facilitate understanding, identical reference numerals have been used, where possible, to designate identical elements that are common to the figures.

DETAILED DESCRIPTION OF THE INVENTION

The present invention provides a method for optimizing a measurement system for a service provider network that supports guaranteed quality of service (QoS). The problem of minimizing the number of pollers in a given network subject to bandwidth constraints is Non-deterministic Polynomial hard (NP hard). The methods discussed herein provide solutions to this problem by using heuristics based on the polling load and the maximum assignment of pollees. The results obtained using a heuristic comprising maximum pollee assignment with re-shuffling is the most scalable in terms of both the number of pollers as well as the total bandwidth consumed by the measurement traffic. Based on empirical studies, the heuristics of the present invention are close to the optimal solution by a factor of 4.5 in terms of the number of pollers and by a factor of 2 in terms of bandwidth consumed. A detailed simulation is provided herein for service provider networks with a hierarchical topology as well as for enterprise networks. The impact of QoS support on measurement systems is accounted for by including the bandwidth required for Multi-Protocol Label Switched (MPLS) tunnel monitoring.

Figure 1:
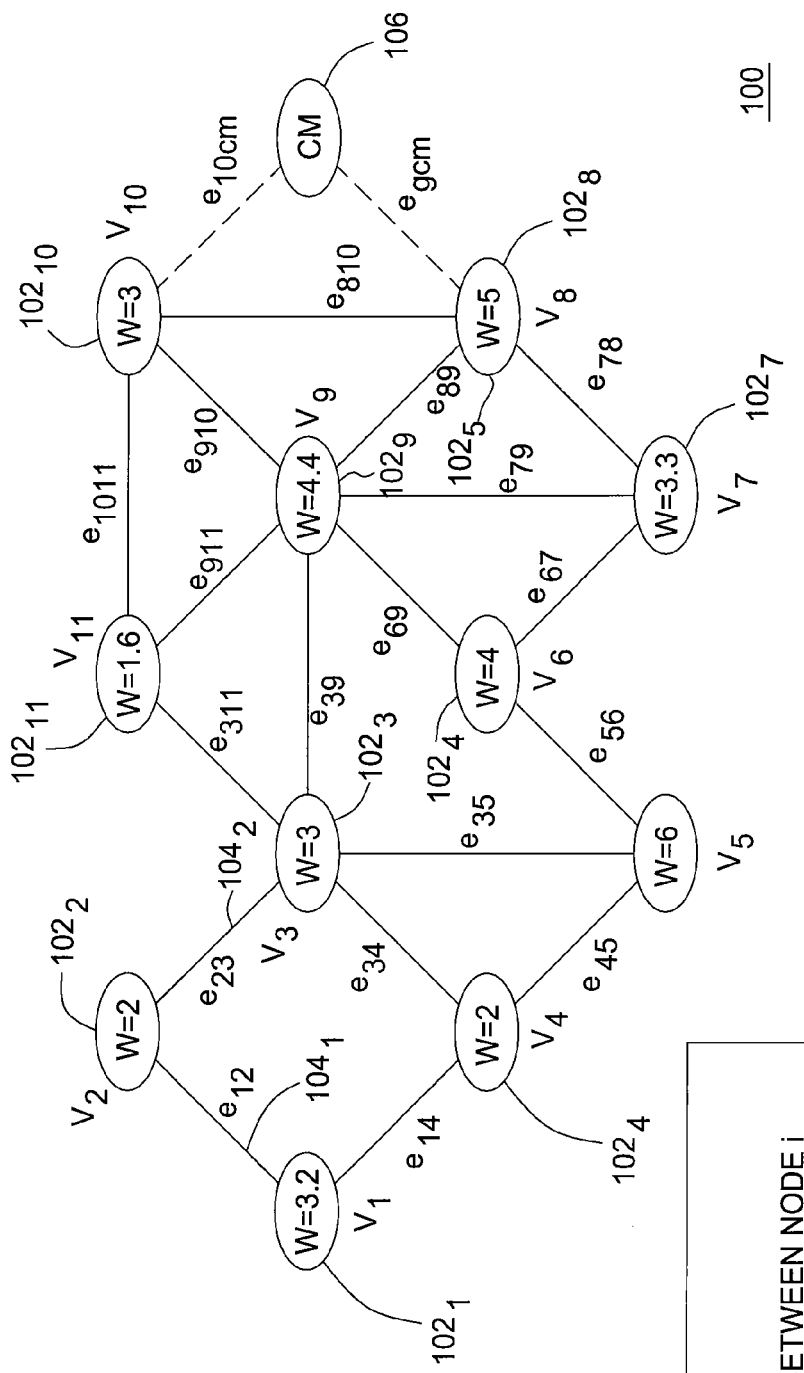
FIG. 1 depicts a schematic diagram of interconnected nodes in a first exemplary network environment.

FIG. 1 depicts a schematic diagram of interconnected nodes in a first exemplary network environment 100. The present invention is illustratively depicted as being used in label switched networks, such as multi-protocol label switching (MPLS) networks, Asynchronous Transfer Mode (ATM) networks, Frame Relay (FR) networks, wavelength division multiplexing (WDM) networks, and new forms of service overlay networks. The network 100 is modeled as a graph (G=(V;E)), where vertices ("V") and edges ("E") of the graph G respectively correspond to the network nodes 102 and the physical links 104 between the nodes 102.

In particular, the network 100 comprises a service provider 101 having plurality of nodes $102_1$-$102_n$ (collectively nodes 102) coupled by a plurality of links $104_1$-$104_p$ (collectively links 104) where n and p are integers greater than one. Each link 104 illustratively comprises two unidirectional (simplex) links (not shown) in opposite direction. A first simplex link provides a transmit path, while a second simplex link provides a receive path. For example, a node $102_1$ is also illustratively labeled $v_1$, while a link $104_1$, labeled $e_{12}$, denotes the signaling connection (e.g., physical wiring or fiber) between nodes $v_1$ and $v_2$ (i.e., nodes $102_1$ and $102_2$).

Referring to FIG. 1, the exemplary network comprises node $v_1$ coupled to node $v_2$ via edge $e_{12}$, node $v_1$ coupled to node $v_4$ via edge $e_{14}$, node $v_2$ coupled to node $v_3$ via edge $e_{23}$, node $v_3$ coupled to node $v_4$ via edge $e_{34}$, node $v_3$ coupled to node $v_{11}$ via edge $e_{311}$, node $v_3$ coupled to node $v_5$ via edge $e_{35}$, node $v_4$ coupled to node $v_5$ via edge $e_{45}$, node $v_3$ coupled to node $v_9$ via edge $e_{39}$, node $v_5$ coupled to node $v_6$ via edge $e_{56}$, node $v_6$ coupled to node $v_7$ via edge $e_{67}$, node $v_6$ coupled to node $v_9$ via edge $e_{69}$, node $v_9$ coupled to node $v_{11}$ via edge $e_{911}$, node $v_9$ coupled to node $v_{10}$ via edge $e_{910}$, node $v_{11}$ coupled to node $v_{10}$ via edge $e_{1011}$, node $v_9$ coupled to node $v_7$ via edge $e_{79}$, node $v_9$ coupled to node $v_8$ via edge $e_{89}$, node $v_7$ coupled to node $v_8$ via edge $e_{78}$, and node $v_8$ coupled to node $v_{10}$ via edge $e_{810}$. Further, aggregator nodes $v_8$ and $v_{10}$ are respectively coupled to the central manager node 106 via links $e_{8cm}$ and $e_{10cm}$.

The present invention is discussed in terms of a hybrid network or hierarchical system network. Taking into account the issues of scalability and network-wide view for large service provider networks, the hierarchical network system utilizes a central manager 106. However, the resource intensive tasks such as polling are distributed among a set of polling nodes. Between the central manager 106 and the polling nodes, there exists a set of aggregating nodes (e.g., nodes $v_8$ and $v_{10}$. The pollers are distributed in the network 100 and each poller is responsible for a polling domain consisting of a subset of the network nodes. Information gathered from the individual polling nodes are then aggregated at the aggregators $v_8$ and $v_{10}$). The condensed information is then sent to the central manager 106 which provides an overall view of network behavior. Such a hierarchical architecture reduces bandwidth overhead while still maintaining a network-wide view.

Figure 11:
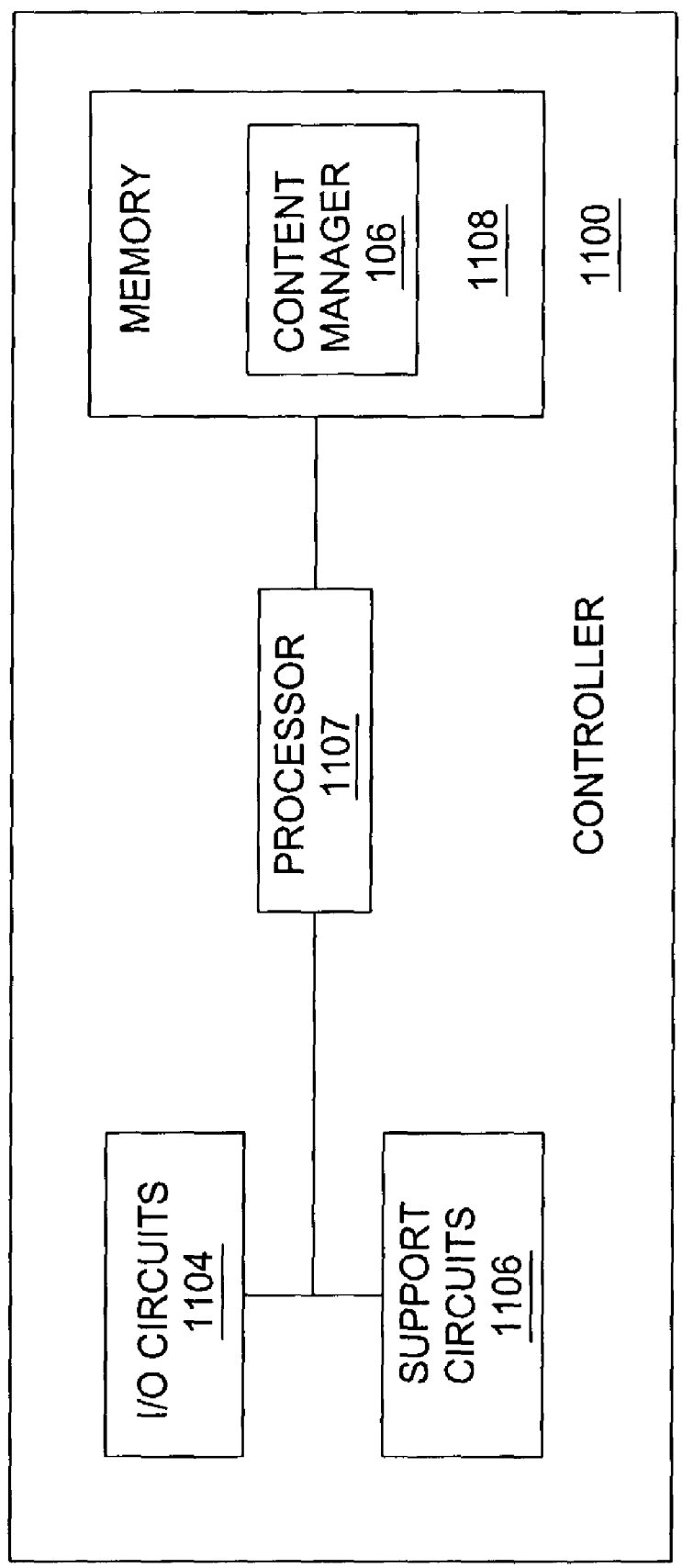
FIG. 11 depicts a high-level block diagram of a controller 1100 suitable for use in the network environment 100 of FIG. 1.

FIG. 11 depicts a high-level block diagram of a controller 1100 suitable for use in the network environment 100 of FIG. 1. Specifically, the controller 1100 of FIG. 11 comprises a processor 1102 as well as memory 1108 for storing various control programs such as the central manager 106. The processor 1102 cooperates with conventional support circuitry 1106 such as power supplies, clock circuits, cache memory and the like as well as circuits that assist in executing the software routines stored in the memory 1108. As such, it is contemplated that some of the process steps discussed herein as software processes may be implemented within hardware, for example as circuitry that cooperates with the processor 1102 to perform various steps. The controller 1100 also contains input/output (I/O) circuitry 1104 that forms an interface between the various functional elements communicating with the controller 1100. For example, in the embodiment of FIG. 11, the controller 1100 optionally communicates with other nodes 102 in the network via link paths 104. The controller 1100 may also communicate with additional functional elements (not shown), such as those described herein as relating to additional channels, processing circuitry, switches, and the like.

Although the controller 1100 of FIG. 11 is depicted as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

In the hierarchical polling-based measurement infrastructure, the bandwidth overhead is mainly composed of polling traffic to the network nodes. The amount of traffic to the aggregator from the polling nodes, and to the central manager 106 from the aggregating nodes, is expected to be significantly smaller. Therefore, by distributing the polling traffic the overall impact on network bandwidth can be significantly minimized. However, using a large number of distributed pollers tends to increase the cost of deployment and increase the complexity of the aggregation process. The exemplary methods described herein identify a small subset of the nodes as the distributed poller locations that are required for a given network topology, with a known polling load under a fixed per link bandwidth constraint. Formulation of the distributed pollers includes the bandwidth constraint explicitly, since it is critical that the measurement system does not create a potential for bottleneck links in the network.

The problem of minimizing the number of pollers in a given network subject to bandwidth constraints is NP hard (i.e., it cannot be solved by a nondeterministic Turing machine in polynomial time; no computer and/or algorithm can output the optimal solution in reasonable amount of time). A system model for the service provider network is an undirected graph model G=(V, E), where V={$v_1, v_2, \ldots, v_n$} is the set of nodes or routers that must be polled, and e=(vi, $v_j$), where i=pollee and j=poller) represents the edge that connects the nodes $v_i$ and $v_j$ and e ∈ E, where E represents the set of edges. This model assumes that the graph edges are undirected since it is assumed that the SNMP poll requests and poll responses are approximately equal in size (number of bytes). That is, polling for large tables is excluded from the model, since there is a significant increase in the response size relative to the query size. The graph model spans the entire service provider network from the aggregating nodes at the access points to the core nodes.

As such, n=|V| represents the total number of routers in the service provider network (including the access routers) and m=|E| represents the total number of links in the network but does not include the incoming links at the access routers.

It is further assumed that SNMP managers (pollers) can be co-located with the network nodes. Each node $v_i$ generates a polling traffic of $w_i$ bits per second (bps). This polling traffic is destined to the poller that has been assigned to this node. The polling load from each node is a function of the number of physical links as well as logical links (i.e. MPLS tunnels). Let l(e) and b(e) represent the actual polling bandwidth used and the amount of link bandwidth allocated for polling traffic for each of the edges. Bandwidth constraint is typically a fraction of the total capacity c(e) on the link.

The optimal poller location and pollee assignment problem (hereinafter termed "minPL") can therefore be stated as follows: Given a network G=(V,E), determine (1) a minimum subset of nodes S∈V on which to place pollers such that the bandwidth constraint on each and every link $l(e) \leq b(e)$ is satisfied where b(e), is the maximum bandwidth that can be used for polling on link (e); and (2) a mapping λ, which maps a pollee to its poller. That is, for each node $v_i$, if $\lambda t(v_i) = v_j$, then node $v_i$ is assigned to the poller placed on node $v_j$. Note that, if $\lambda(v_i) = v_i$, then node $v_i$ is being polled by itself.

In a typical service provider network the routing paths are fairly stable. Accordingly, it may be assumed that the routes between the poller and the pollee are fixed and symmetric. Further, the routing paths are known, and therefore considered as input to solving for poller placement in the network.

Integer Programming Formulation minPL

Given the assumption that the routes are fixed between any given poller-pollee pair, the minPL problem formulation presented above can be casted into an integer programming formulation. The objective is to minimize the number of pollers required to poll all of the nodes in the network 100 within the bandwidth constraints, which may be expressed as:

(1) Minimize $\sum_{j=1}^{n} y_j$; subject to:

(2) $\sum_{j=1}^{n} x_{ij} = 1$, for each $v_i \in V$;

(3) $x_{ij} \leq y_j$, for each $v_i, v_j \in V$;

(4) $\sum_{i}^{n} \sum_{j}^{n} \delta_{e}^{ij} w_i x_{ij} \leq b(e)$ for each $e \in E$;

(5) $x_i \in \{0,1\}$, for each $v_i, v_j \in V$;
(6) $y_j \in \{0,1\}$, for each $v_j \in V$;

where:

n=|V| is the total number of nodes in the network. The binary variable $x_{ij}$ indicates whether node $v_i$ is polled by node $v_j$, where $v_i, v_j \in V$. The binary variable $\delta^{ij}_e$ indicates whether edge e belongs to the path $P_{ij}$ between node $v_i$ and $v_j$. Let $w_i$ represent the polling bandwidth required to poll node $v_i$ and $b_e$ corresponds to the bandwidth constraint on the edge (physical link) e. Further, the first constraint makes sure that each node $v_i$ is assigned to exactly one poller. The second constraint guarantees that a node $v_j$ must be a poller if some other node $v_i$ is assigned to it. The third constraint ensures that the sum of the polling bandwidth used by all the poller-pollee pairs on each link does not exceed its allocation.

The minPL problem is proven to be nondeterministic polynomial hard (NP-hard) via a reduction from the multi-processor scheduling problem, which is stated as follows. Given the set of tasks T, the number of available processors m, length L(t) for each task $t \in T$ and a deadline $$d < \sum_{t \in T} L(t)),$$

find a m-processor schedule that meets the overall deadline. The above instance of the m-processor scheduling problem may be applied to an instance of the minPL problem. Specifically, for each task $t \in T$, create a pollee node that has a polling demand of L(t).

Figure 2:
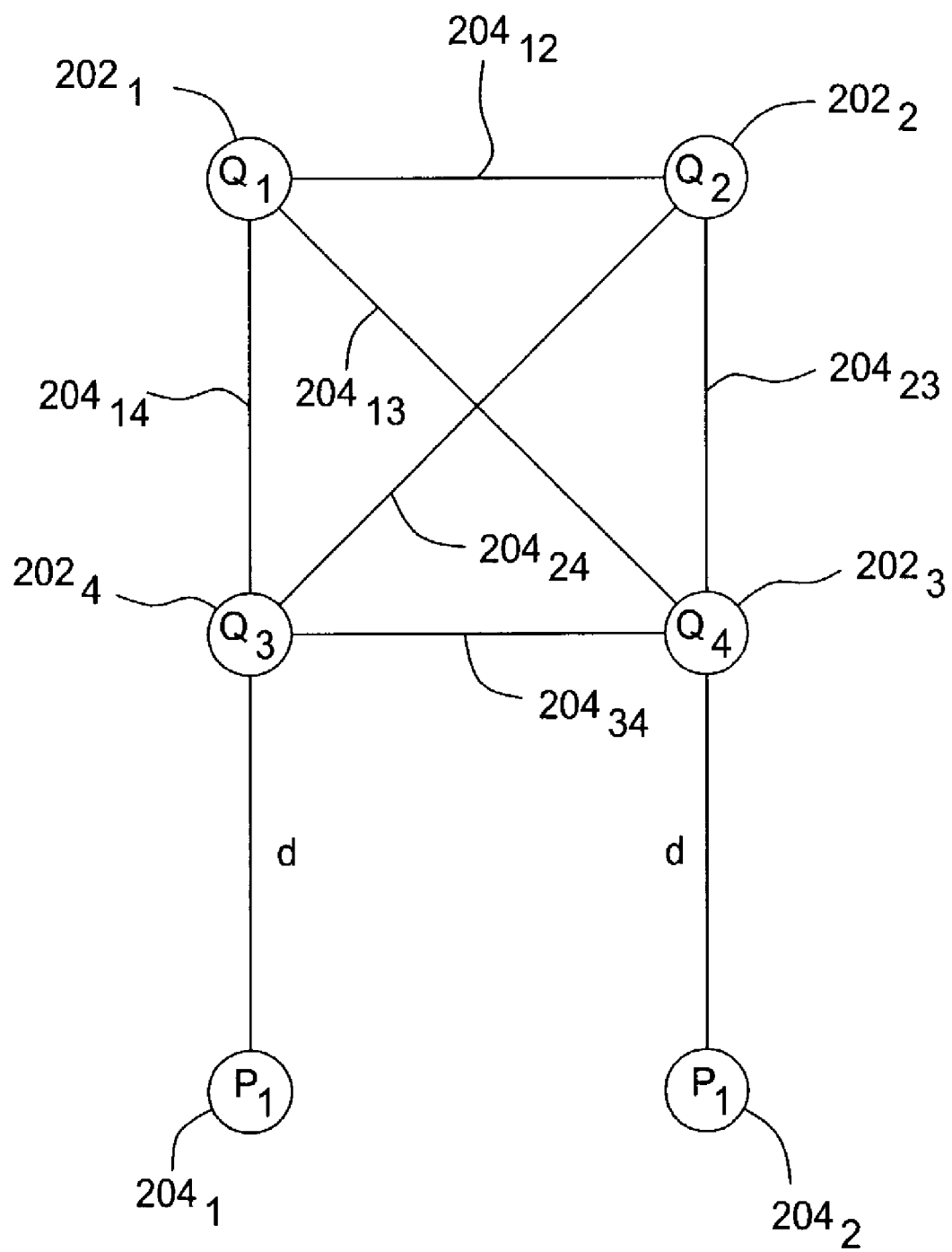
FIG. 2 depicts a second exemplary network illustrating a reduction from scheduling problem.

FIG. 2 depicts a second exemplary network 200 illustrating a reduction from scheduling problem. Specifically, FIG. 2 illustrates the minPL instance constructed from a scheduling problem that has four tasks, two processors, and a deadline d. A plurality of nodes 202 illustratively labeled $Q_1$ through $Q_4$ 202$_1$ through 202$_4$ are pair-wise connected by links (e.g., links 204$_{12}$, 204$_{23}$, 204$_{34}$, 204$_{14}$, 204$_{13}$, and 204$_{24}$) that have a polling bandwidth allocation of $$\sum_{t \in T} L(t).$$

Such a construction results in a clique (i.e., a set of vertices in an undirected graph in which every vertex has an edge to every other vertex) of size |T|. For each processor in the scheduling problem, create a new node whose bandwidth demand is $$\sum_{t \in T} L(t),$$

and connect this node to an arbitrary node in Q with a new link that has d amount of bandwidth allocated for polling traffic. This step creates m additional nodes represented by P, and m additional links.

Accordingly, any node in P can only be polled by itself, since its only link has bandwidth constraint d, which is less than its own demand $$\sum_{t \in T} L(t).$$

Therefore, the solution to this minPL instance has at least m pollers. Consequently, if the minPL problem has exactly m pollers, all nodes in P and only nodes in P are pollers, with each poller handling no more than d amount of traffic from its pollees in Q. Since every node in Q is polled by a node in P, the poller-pollee relation between nodes in P and Q gives a m-processor schedule that satisfies the deadline d. On the other hand, suppose that the scheduling problem has a m-processor schedule, then a m-poller solution can be constructed as follows: for a node $q \in Q$, find the processor on which the task represented by q is scheduled, and let q be polled by the node $p \in P$ that represents that processor.

Heuristic Algorithms for minPL

Figure 3:
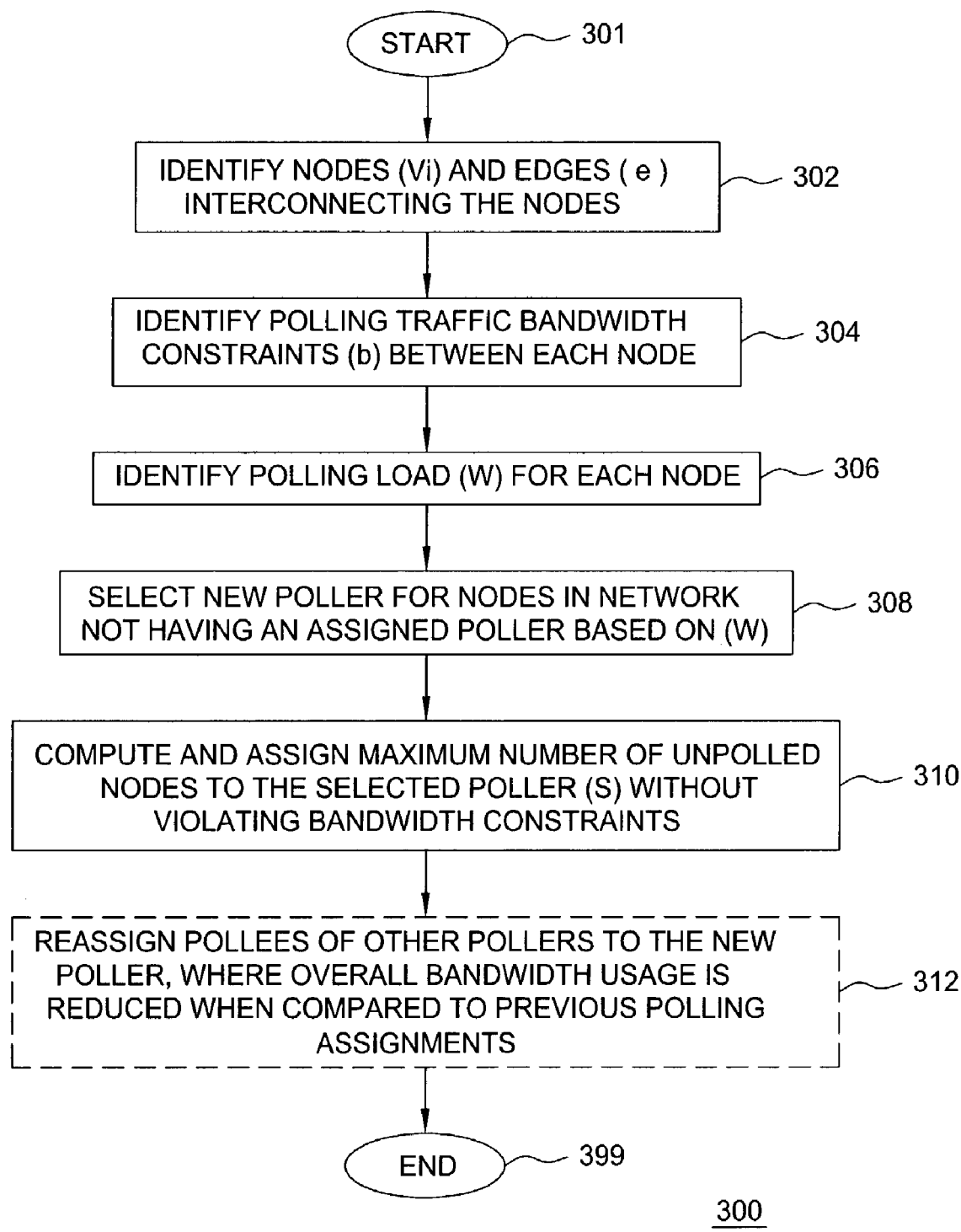
FIG. 3 depicts a flow diagram of first method of heuristically deploying distributed polling stations in the exemplary network environment of FIG. 1.
Figure 4:
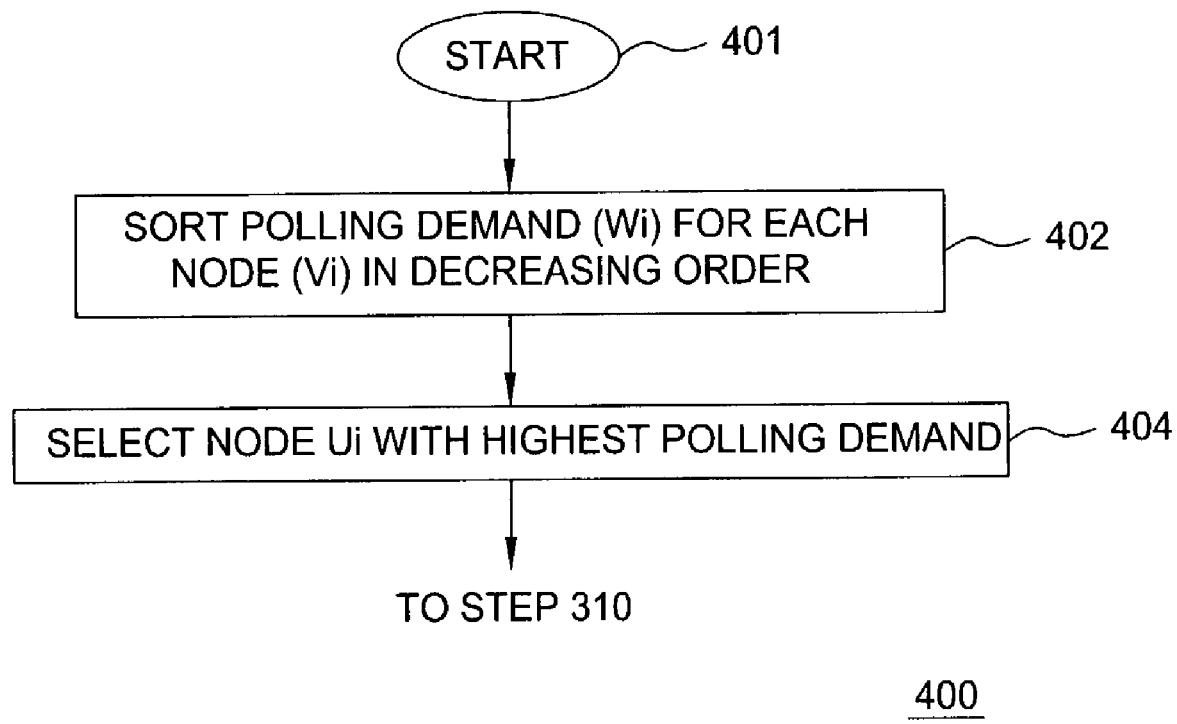
FIG. 4 depicts a flow diagram of a method of selecting a new poller.

As discussed above, the Integer Programming formulation minPL has an exponential running time in the worst case. FIGS. 3 and 4 illustrate various embodiments of heuristics that provide solutions to this problem, such that these solutions are evaluated based on the number of pollers chosen and the total bandwidth overhead incurred. Additionally, in FIG. 5, a random poller placement scheme is provided, which serves as a base line for the evaluation of the two main heuristics employed. The results obtained by the heuristics are also compared with a Linear Programming (LP) relaxation model that serves as an exemplary lower bound to compare with the heuristics.

FIG. 3 depicts a flow diagram of first method 300 of heuristically deploying distributed polling stations in the network environment 100 of FIG. 1. The method 300 of FIG. 3 should be viewed together with FIG. 1. The first heuristic (termed "HmaxLoad") illustrated by method 300 includes selection of additional pollers based on polling load.

The method 300 starts at step 301, and proceeds to step 302, where the nodes (v) and interconnecting edges (e) are identified, as illustratively shown in FIG. 1. At step 304, the polling traffic bandwidth constraint (b) between each node is identified. Referring to FIG. 1, the polling traffic bandwidth constraint (b) for all links is 10.

It is noted that the bandwidth requirement "b" is usually provided in terms of bitrate (e.g., 30 Mbits per second), as typically used in regard to MPLS, ATM, and FR networks. For WDM networks, b is represented by a magnitude of wavelengths without any units. In other context, such as service overlay networks, b can be some other metric as long as all links in the graph consistently use the same type of metric or that conversion between used metrics is provided.

At step 306, the polling load (w) for each node is identified. Referring to FIG. 1, the polling load (w) illustratively for nodes v1 to v11 are: $w_1=3.2$, $w_2=2$, $w_3=3$, $w_4=2$, $w_5=6$, $w_6=4$, $w_7=3.3$, $w_8=5$, $w_9=4.4$, $w_{10}=3$, and $w_{11}=1.6$. At step 308, a new poller is selected for nodes $v_i$ in the network 100 not having an assigned poller.

FIG. 4 depicts a flow diagram of a method 400 of selecting a new poller. It is noted that method 400 illustrates one embodiment for selecting a new poller of step 308 of FIG. 3. Specifically, method 400 starts at step 401 and proceeds to step 402, where the polling demand $w_i$ of each node $v_i \in V$-S is sorted in decreasing order, where S=poller nodes previously selected. It is further noted that in instances where the first poller is chosen using the polling load criteria S is empty. At step 404, the node having the highest polling demand ($w_i$) is then selected as the new poller (u).

For example, referring to FIG. 1, the exemplary polling nodes are sorted in decreasing order of $v_5$, $v_8$, $v_9$, $v_6$, $v_7$, $v_1$, $v_3$, $v_{10}$, $v_2$, $v_4$, and $v_{11}$. Accordingly, since $v_5$ has the highest polling load of w=6 as compared to the other nodes in the network, node $v_5$ is selected as the new polling node (u). The method 400 then proceeds to step 310.

At step 310, the central manager computes and assigns the maximum number of unpolled nodes to the selected (new) poller without violating the bandwidth constraints.

Once a new poller (u) is selected in step 308, a determination of a set of pollees to be assigned to that poller is performed. Ideally, a maximum number of un-polled nodes are assigned to a new poller (u). Note that an un-polled node refers to those nodes that are not yet assigned to a poller. This problem is herein referred to as a "MaxPollee" problem, which states: given a poller u, find the maximum set of pollees $v_i$ that can be polled by a without violating the bandwidth constraint of the links.

Let $G_0=(V, E)$ be the graph where $E_u$ includes edges on the route from v to u, for each $v \in V-\{u\}$. One problem is where $G_u$ is not a tree. In instances where $G_u$ is not a tree, the problem is considered NP-hard (can not be solved in a reasonable time). However, the problem can be solved optimally where the network graph $G_u$ is assumed as forming a tree. This assumption is reasonable since the shortest path routes in a network form a tree.

Figure 5:
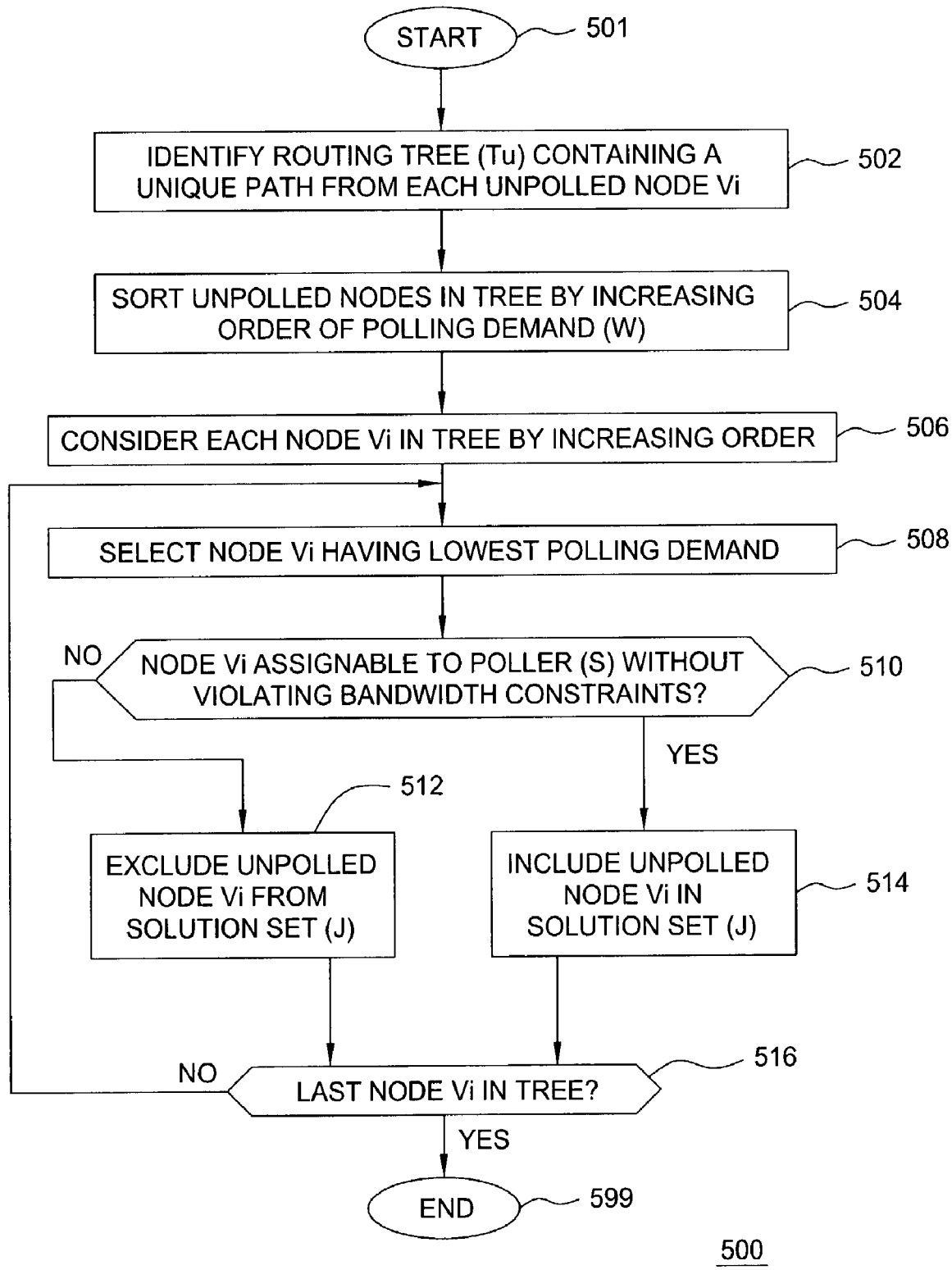
FIG. 5 depicts a flow chart of a method for determining the maximum number of unpolled nodes that may be assigned to a poller node.

FIG. 5 depicts a flow chart of a method 500 for determining the maximum number of unpolled nodes that may be assigned to a poller node. It is noted that method 500 illustrates one embodiment for computing and assigning pollees to a selected poller of step 310 of FIG. 3. The method 500 starts at step 501, and proceeds to step 502, where a routing tree from the selected node (s) is identified. The routing tree ($t_v$) is predefined and contains a unique path from each unpolled node to the selected (poller) node(s). For example, referring to FIG. 1, a routing tree $t_v$ may illustratively have its root at node $v_5$ (the selected poller), and a first path (branch) formed by nodes $v_5$-$v_6$, $v_6$-$v_7$, a second path formed by nodes $v_5$-$v_4$, $v_4$-$v_1$, a third path formed by nodes $v_5$-$v_3$, $v_3$-$v_2$, a forth path formed by nodes $v_6$-$v_9$, $v_9$-$v_8$, $v_8$-$v_{10}$, and a fifth path formed by nodes $v_9$-$v_{11}$.

At step 504, the unpolled nodes in the tree are sorted in increasing order. Specifically, the algorithm first sorts the nodes in increasing order based on demand (w). For example, referring to FIG. 1, the sorted unpolled nodes in the exemplary tree $t_{v5}$ (rooted at $v_5$) include, in increasing order, of polling demands (ties broken by their level in the tree), $w_{11}=1.6$, $w_4=2$, $w_2=2$, $w_3=3$, $w_{10}=3$, $w_1=3.2$, $w_7=3.3$, $w_6=4$, $w_9=4.4$ and $w_8=5$.

If the demands (w) are the same for any two nodes, then their level (i.e., placement) in the tree is considered, where the node with smaller level appears first in the ordering scheme. For example, nodes $v_3$ and $v_{10}$, have the same polling load (3), while $v_4$ and $v_2$ having the same polling load (2). As between nodes $v_3$ and $v_{10}$, $v_3$ is one hop from poller node $v_5$, while $v_{10}$ is four hops from poller node $v_5$. Accordingly, node $v_3$ is ordered before node $v_{10}$. Regarding nodes $v_2$ and $v_4$, $v_4$ is one hop (level) from poller node $v_5$, while $v_2$ is two hops from poller node $v_5$. Accordingly, node $v_4$ is ordered before node $v_2$. If the level is also the same, then a node with the smaller identifier (e.g., IP address) appears first.

At step 506, each node $v_i$ in the tree is considered in increasing rank of the ordering scheme of step 504. At step 508, an unpolled node $v_i$ is selected, where the selected node $v_i$ has the lowest demand (w) in the sorted list of step 504. At step 510, if a pollee v can be assigned to poller s without violating the bandwidth constraint on each link, then v is included in a solution set J. In the example above, node $v_{11}$ is considered first, followed by node $v_4$, then node $v_2$, and so forth.

If at step 510, the selected node $v_i$ is not assignable to the poller (s) without violating the bandwidth constraints, then the method proceeds to step 512, where the selected node $v_i$ is excluded from the solution set (J). Otherwise, if at step 510, the selected node $v_i$ is assignable to the poller (s) without violating the bandwidth constraints, then the method proceeds to step 514, where the selected node $v_i$ is included in the solution set (J).

For example, referring to FIG. 1, recalling that all links have the same bandwidth constraint b=10, node $v_{11}$ has a polling load of 1.6 and can therefore be assigned to poller $v_5$ without violating the bandwidth constraint on links $e_{119}$, $e_{96}$, and $e_{65}$; node $v_2$ has a polling load 2 and can therefore be assigned to poller $v_5$ without violating the bandwidth constraint on links $e_{23}$ and $e_{35}$. Similarly, nodes $v_4$, $v_3$, $v_{10}$, $v_1$, and $v_7$ can be assigned to poller $v_5$ without violating bandwidth constraints on link.

Once the determination of whether the selected node $v_i$ is included or excluded from the solution set J, the method 500 proceeds to step 516, where a determination is made as to whether the selected node is the last unpolled node in the tree that has been checked to comply with the bandwidth constraints. If at step 516, the selected node is not the last node in the tree that has been checked, then the method 500 proceeds to step 508, where steps 510 through 516 are performed on the next unpolled node in the sorted list of step 504. Otherwise, at step 516, if the selected node is the last node in the tree that has been checked, then the method 500 proceeds to step 599, where method 500 ends.

This first heuristic embodiment of FIG. 3 is based on the intuition that by choosing additional pollers based on their own polling load, the impact on the bandwidth constraints on the individual links of the network may be minimized. It is noted that the difference in polling load for the different nodes in the network is due to the degree of the node as well as the nature of the information being polled. For example in the case of an MPLS network, if the information pertaining to the MPLS tunnels are only polled at the source and destination nodes, then this will cause the edge nodes to have a significantly higher polling bandwidth than the core nodes. The method 300 then proceeds to optional step 312, which is discussed below in further detail with regard to FIG. 8.

It is further noted that method 300 is repeated until there are no longer any unpolled nodes in the network. In the example provided above, nodes $v_{11}$, $v_4$, $v_2$, $v_3$, $v_{10}$, $v_1$, and $v_7$ are all assignable to node $v_5$ without violating bandwidth constraints. Accordingly, method 300 is also performed to ensure that nodes $v_6$, $v_9$, and $v_8$ are also polled by at least one additional poller node. For example, if node $v_9$, is determined at step 308 to be a second polling node, then at step 310 of method 300 further determines whether nodes $v_6$ and $v_8$ may be polled by node $v_9$. If so, then two pollers (s) are all that are required to poll all the nodes in the exemplary network 100. If not, then additional pollers are provided according to the method 300 of FIG. 3.

Figure 6:
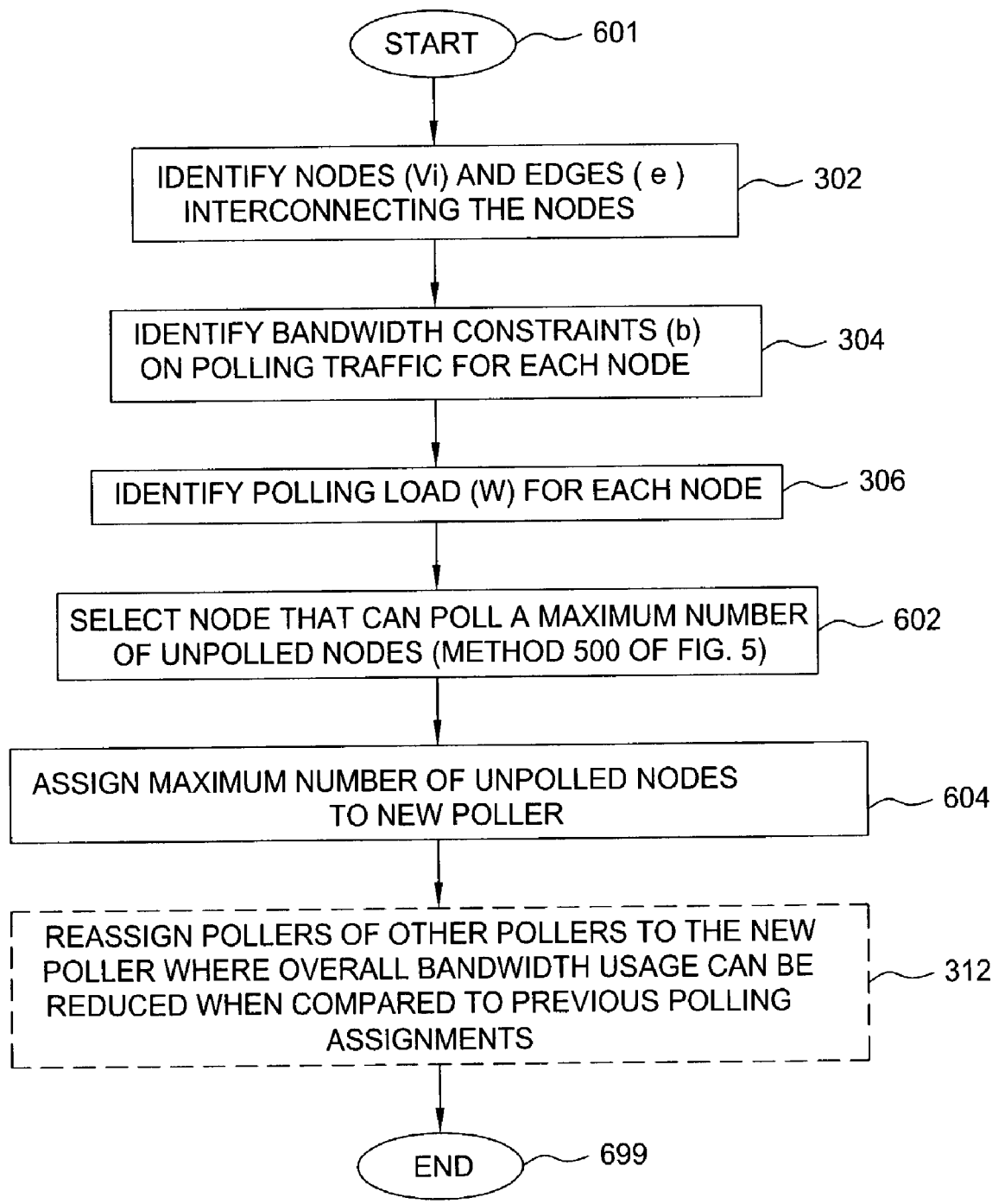
FIG. 6 depicts a flow diagram of a second method of heuristically deploying distributed polling stations in the exemplary network environment of FIG. 1.

FIG. 6 depicts a flow diagram of a second method 600 of heuristically deploying distributed polling stations in the exemplary network environment of FIG. 1. The second heuristic provides poller selection based on maximum number of pollees, where the algorithm is termed "HmaxPollee." Specifically, the second method 600 includes choosing an additional poller u from the set V-S such that node u can poll the maximum number of additional pollers without violating bandwidth. Recall that $V_i$=all of the unpolled nodes in the network and S=previously assigned pollers in V. By assigning as many pollees as possible to each poller, the number of pollers required may be minimized without violating the imposed bandwidth constraints.

The HmaxPollee algorithm (G, $T_u$, λ, u, w, b) is expressed as:

Input: G=(V,E) is the undirected network;
$T_u$=tree containing the unique path from each un-polled node;
λ maps pollee to its poller
u=new poller;
w=polling load;
b=bandwidth constraint;
v ∈ V-{S} ; where S=previously identified pollers
Output: J ⊆ V=maximum set of pollees that can be polled by u.
1) Set J=0
2) Sort unpolled nodes in increasing demand w and their level in the tree
3) Consider each node v in increasing rank
4) If (canAssign ($T_u$, u, v, w, b))
5) J=J∪{v}
6) Return J Method 600 starts at step 601, and proceeds to steps 302, 304, and 306, as described above with regard to the first heuristic of method 300 of FIG. 3. That is, the central manager 106 identifies the nodes and interconnecting edges in the graph G=(V, E), identifies the polling traffic bandwidth constraints (b) for each node, as well as the polling loads (w) of each node. The method 600 then deviates from method 300 and proceeds to step 602.

At step 602, a new poller node u is selected that can poll a maximum number of unpolled nodes. Specifically, the method 600 proceeds to method 500, where each node $v_i$ is considered as a possible poller by examining the number of pollees that may be assigned to it, without violating the bandwidth constraints.

As discussed with regard to method 500, for each routing tree, all of the unpolled nodes $v_i$ are sorted in increasing order based on their respective polling loads (step 504). Each node in the sorted list is a candidate to become a new poller (u), where the selected node is then examined to determine the number of unpolled nodes that may be associated with that selected node (steps 508 through 516). The node having the highest number of unpolled nodes associated with it without violating the bandwidth constraints is selected as a poller node. It is noted that where the first poller is chosen using the polling load criteria (i.e. in the algorithm), then S is empty. If a pollee v can be assigned to poller u without violating the bandwidth constraint on each link, then selected node v is included in the solution set J.

For example, referring to FIG. 1, node $v_5$ may be able to poll 7 nodes, node $v_9$ may be able to poll 9 nodes, node $v_3$ may be able to poll 10 nodes, and so forth. If node $v_3$ can poll the highest number of unpolled nodes, such that J=10, then at step 604, node $v_3$ is selected as a polling node and the unpolled nodes in set J are assigned to node $v_3$.

Steps 602 and 604 of method 600 are repeated until there are no longer any unpolled nodes remaining in the network 100. As such, more than one poller node (u) in the set of poller nodes (s) may be required to solve the poller-pollee problem. The method 600 then proceeds to optional step 312, which is discussed below in further detail with regard to FIG. 8.

Figure 7:
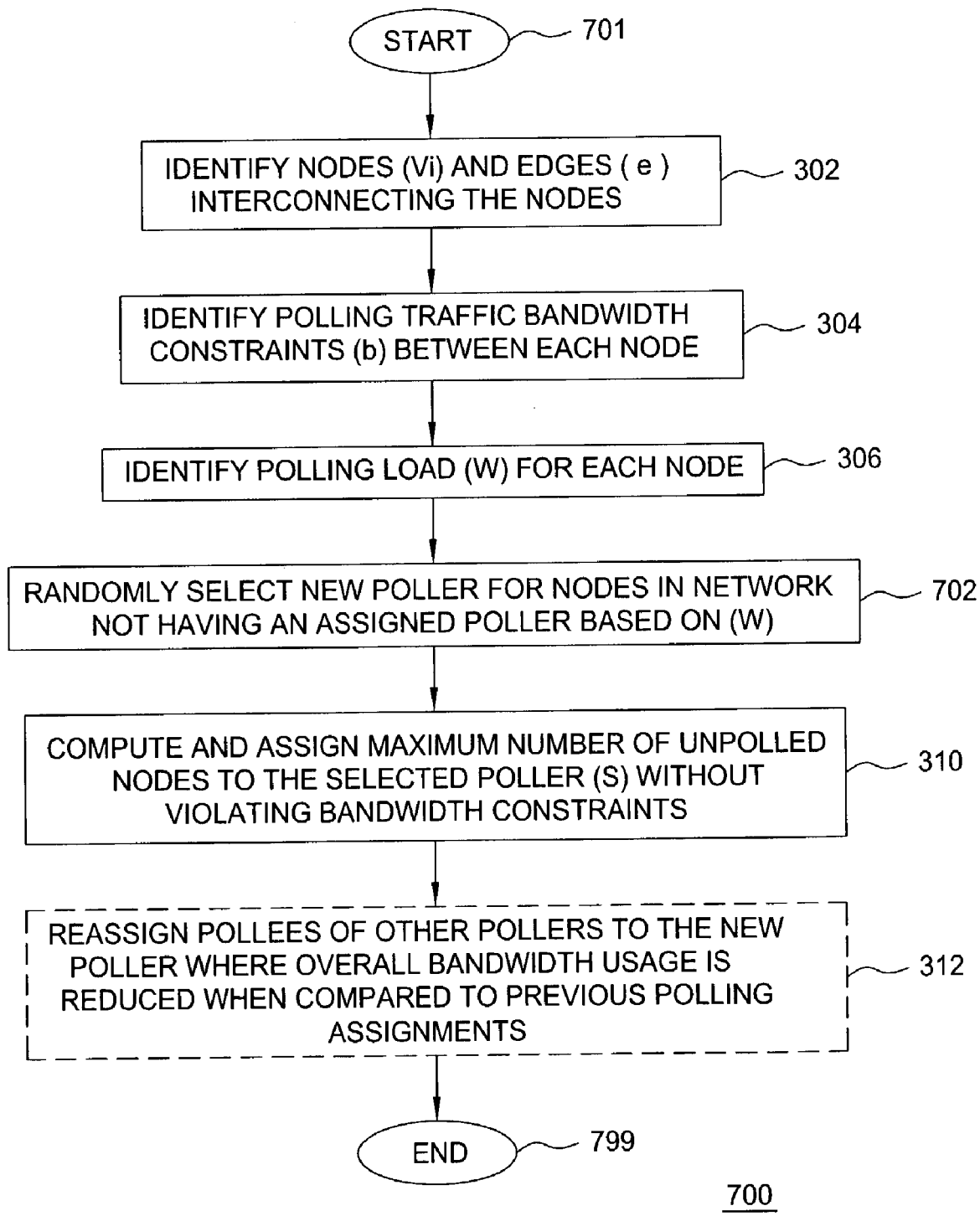
FIG. 7 depicts a flow diagram of a third method of heuristically deploying distributed polling stations in the exemplary network environment of FIG. 1.

FIG. 7 depicts a flow diagram of a third method 700 of heuristically deploying distributed polling stations in the exemplary network environment of FIG. 1. The third heuristic comprises selecting a poller u from V-S randomly, where the algorithm is termed "Hrandom". This third heuristic may serve as a base-line comparison for the other two heuristics discussed above.

Method 700 starts at step 701, and proceeds to steps 302, 304, and 306, as described above with regard to the first heuristic of FIG. 3. That is, the central manager 106 identifies the nodes and interconnecting edges in the graph G=(V, E), identifies the polling traffic bandwidth constraints (b) for each node, as well as the polling loads (w) of each node. The method 700 then deviates from method 300 and proceeds to step 702.

At step 702, a first node is randomly selected as a poller node (u) in the set of poller nodes {s}. Accordingly, step 702 of method 700 differs from step 308 of method 300, since the node selected is not based upon the polling load of that particular node. Rather, the node is randomly selected from all of the available unpolled nodes. The method 700 then proceeds to step 310, which is performed in the manner described above. That is, utilizing method 500 of FIG. 5, a poller is randomly selected and unpolled nodes are assigned to the selected polling nodes without violating the bandwidth constraints. The method 700 then proceeds to optional step 312, which is discussed below in further detail with regard to FIG. 8.

Once a poller $u_i$ has been selected and all of the unpolled nodes have been assigned to a poller $u_i$ without violating bandwidth constraints, the methods 300, 600, and 700 proceed to select additional pollers until there are longer any remaining unpolled nodes in the network 100. After each new poller is selected, then, at optional step 312, a technique is provided to overcome inefficiencies in bandwidth usage, where the technique (algorithm) is termed "Polleeshuffle."

Figure 8:
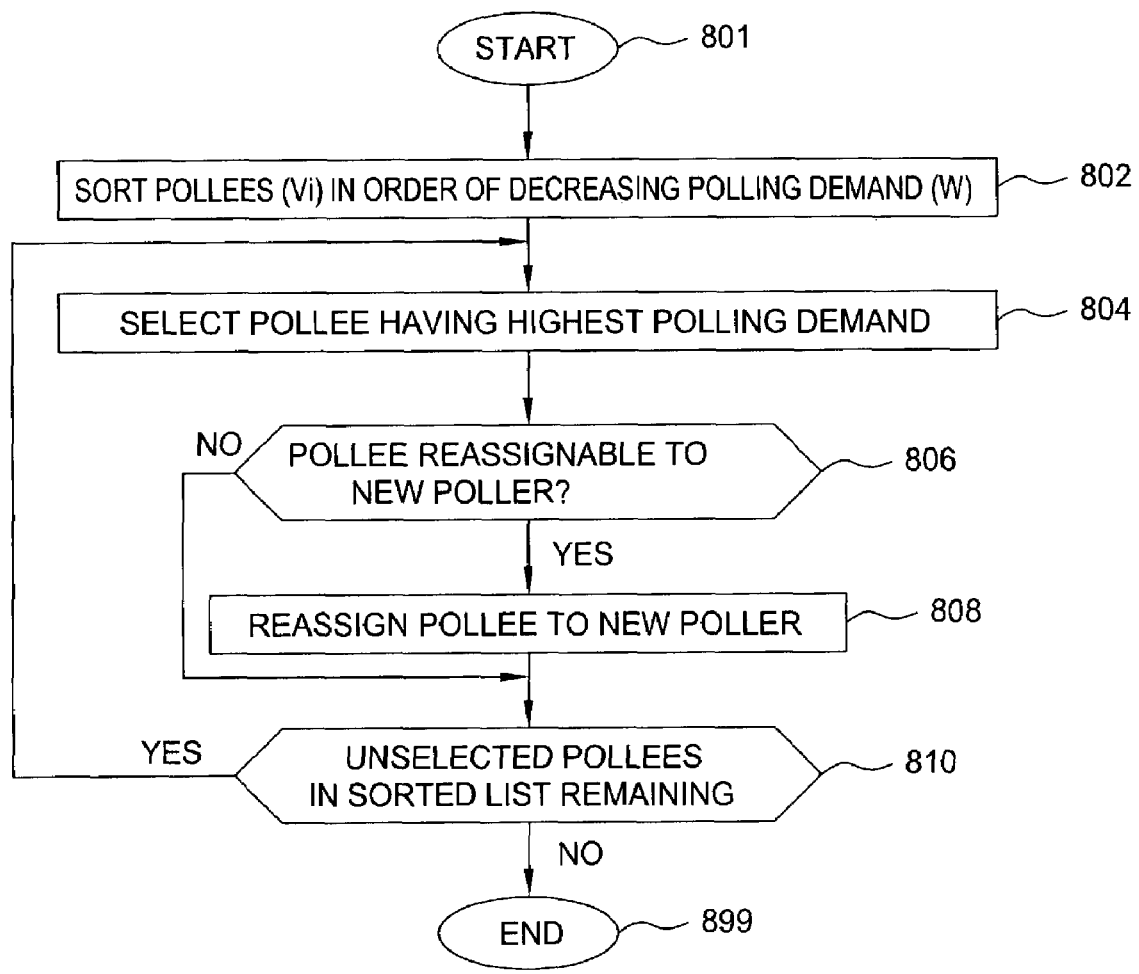
FIG. 8 depicts a flowchart of an exemplary method of reassigning pollees to improve bandwidth usage.

The Polleeshuffle algorithm (G, S, λ, u, w, b) is expressed as:

1) sort all the pollees in the set V-S in decreasing demand;
2) for each v ∈ V-S,
3) if (ReduceBandWidth (G, v, u, w, b))
4) λ, (v)=u;
5) for each s ∈ S
6) if (NumPollees (s)=0 and CanAssign ($T_u$, u, s, w, b))
7) λ, (s)=u;
8) S=S-s FIG. 8 depicts a flowchart of an exemplary method 800 of reassigning pollees to improve bandwidth usage to satisfy the requirements of step 312. Specifically, method 800 illustrates the algorithm Polleeshuffle above. The method 800 starts at step 801 and proceeds to step 802, where the pollees are sorted in order of decreasing load demand (w). That is, each after a new poller is selected and the pollees are assigned to the selected poller, the assigned pollees $v_i$ are sorted in order of decreasing load demand (w).

Referring to FIG. 1, assuming a first node $v_5$ was previously selected using the first heuristic method of FIG. 3, and a new node $v_9$ is subsequently selected, the pollees assigned to both poller nodes $v_5$ and $v_9$ are sorted in order of decreasing load demand. The exemplary sorted list includes in decreasing rank, nodes $v_8$, $v_6$, $v_7$, $v_1$, $v_{10}$, $v_3$, $v_4$, $v_2$, and $v_{11}$. At step 804, the polle having the highest polling demand is selected first for determination of reassignment to a new poller. In this instance, node $v_8$ is selected first.

At step 806, a determination is made as to whether a pollee may be reassigned to another (new) pollee. The determination of step 804 is performed for each pollee in the order provided in the sorted list. For example, node $v_8$ was originally assigned to first poller $v_5$ and requiring a bandwidth utilization of 6.6 (i.e., requires 3.3 from each of the links $e_{76}$ and $e_{65}$). The new poller $v_9$ only requires a bandwidth utilization of 3.3 as node $v_7$ has a direct link to $v_9$.

If the determination of step 806 is affirmatively answered, then at step 808, the selected pollee is reassigned to the new poller. For example, since the pollee $v_8$ illustratively uses less bandwidth utilization by being polled by the new poller $v_9$ as compared to original poller $v_5$ (i.e.,3.3<6.6), pollee $v_7$ is reassigned to new poller $v_9$. The method 800 then proceeds to step 810.

Further, if the determination of step 806 is negatively answered, then the method 800 also proceeds to step 810. At step 810, a query is made as to whether there are any unselected pollees from the sorted list remaining unchecked. If the query is negatively answered, then the method 800 proceeds to step 899 where the method ends. If the query is affirmatively answered, then the method 800 proceeds to step 804, and continues through steps 806 and 810, until all of the pollees in the sorted list have been checked in accordance with steps 806 through 810. It is noted that method 800 is utilized each time a new poller is added to the network. Referring to method 300 of FIG. 3, once the reassigning (reshuffling) of pollees is provided after each poller is added to the network (step 312), steps 302 through 312 are repeated until all of the unpolled nodes have been assigned to poller nodes. Further, the assigned poller nodes are optionally reassigned to a new poller, as discussed above with regard to steps 312 and method 800 of FIG. 8. Likewise, optional step 312 (and method 800 of FIG. 8) may be similarly performed in the second and third heuristics respectively described in methods 600 and 700 of FIGS. 6 and 7.

It is also noted that the PolleeShuffle algorithm may be augmented with additional mechanisms to reduce the number of pollers in the process. For example, if all the pollees of a particular poller (s) have been reassigned, then an attempt to try to reassign the particular poller (s) to the current poller and remove poller (s) if the reassignment complies with bandwidth constraints. Alternatively, the PolleeShuffle algorithm may be performed separately for each existing poller (s) and its pollees. This increases the chance that a poller is removed during the ShuffleAndReduce process. One skilled in the art will appreciate other variations may be used for shuffling node assignments.

Simulations of the three heuristic algorithms of methods 300, 600, and 700 have been performed over various networks of various sizes (e.g., 200, 400, and 800 nodes), where each link allocates a certain fraction ("LINKF") of their bandwidth for polling traffic based on the capacity constraint imposed for the link. Comparisons between the three heuristic algorithms 300, 600, and 700 are illustratively shown in Tables 1-9 of FIGS. 9A-9C.

FIGS. 9A-9C each depict three tables providing various comparison information regarding the heuristic methods of FIGS. 3, 6, and 7. The tables illustrate performance of the various heuristic algorithms on several different topologies and parameter settings. For simplicity, shortest path routing is assumed. The focus is to optimize the measurement infrastructure for service provider networks. However, in the interest of discussing the performance of the algorithms, enterprise network results are also discussed below.

Since the service provider network is inherently hierarchical with metro and core networks, hierarchical network topologies are generated. In typical service provider networks, there are three types of links: (1) intracore link; (2) intra-metro link; and (3) metro-to-core link. Referring to Table 1 of FIG. 9A, three scenarios with different capacity allocation schemes (optical carrier levels, e.g., OC48, OC3, OC 12, among others) as shown. These schemes are reasonable approximations of today's provider networks. For each bandwidth tier, each heuristic algorithm is performed in networks of various sizes, such as 200, 400, and 800 node networks.

It is assumed that each interface or MPLS tunnel requires a polling bandwidth of 4 kbps/sec. The number of MPLS tunnels per node is randomly chosen from the range of 1-1000, which is typical of service provider environments. Since the number of MPLS tunnels is expected to be large, for scalability reasons, the tunnels are only monitored at the source and destination nodes. Further, core nodes are not polled for MPLS specific information.

For each tier of service provider networks, five topologies are generated. Each link allocates a certain fraction ("LINKF") of their bandwidth for polling traffic based on the capacity constraint imposed for the link. This fraction is the same for all links in the simulation. The results presented are averaged over the different topologies. The performance metrics are (1) total number of pollers required, and (2) fraction of total bandwidth consumed for polling.

Table-2 compares the performance of the HmaxLoad, HmaxPollee, and HRandom algorithms. Each tuple in the Table-2 represents the average number of pollers used with the variance term and the fraction of bandwidth used for polling. From Table-2, the HmaxPollee algorithm 600 performs better than the other two heuristics 300 and 700 in terms of the number of polices required with some increase in polling bandwidth. For example, when LINKF=5%, HmaxPollee 600 needs only 6 pollers, whereas HmaxLoad 300 and Hrandom 700 respectively needs 9 and 7 additional pollers. When LINKF=10%, HmaxPollee 600 needs just 2 pollers, whereas HmaxLoad 300 and HRandom 700 need 5 and 4 additional pollers. Note that in each case there is a clear tradeoff between the number of pollers and the bandwidth consumed. Although HmaxPollee 600 requires fewer number of pollers, it consumes more bandwidth than the other two heuristics 300 and 700. The performance of the HmaxPollee 600 with respect to the HRandom heuristic 700 remains the same regardless of the capacity constraint. This implies that in order to reduce the number of pollers required, choosing a poller based on the ability to poll maximum number of nodes is the best scheme (note that HmaxPollee 600 and Hrandom 700 differ only at this step of picking the poller). However, the reduction in the number of pollers comes at the cost of bandwidth consumed.

Moreover, by increasing the capacity reserved (LINKF parameter) for polling, the number of pollers may be reduced regardless of the heuristics used. This further highlights the importance of the bandwidth constraint in the formulation of this problem.

Table-3 of FIG. 9A illustrates the effect of implementing the shuffleandreduce algorithm 800 of FIG. 8 using the HmaxPollee algorithm of method 600 as an example. Note that the effect of the pollee shuffle is primarily aimed at reducing the bandwidth consumed. Without implementing the ShuffleAndReduce algorithm, bandwidth usage would be 29% more in the 200 node networks when LINKF=5%. In an instance where no shuffling is provided in networks having 400 nodes, five (5) additional pollers are required when LINKF=5%. In addition, bandwidth usage increases by 36%. The ShuffleAndReduce algorithm 800 reduces the number of pollers because it clusters the pollees around the closest poller. This results in reduced bandwidth consumption at each step, which in turn reduces the total number of pollers needed.

Tables 4 and 5 of FIG. 9B illustrate the effects of link capacity. It is noted that the number of pollers needed is inversely proportional to the network capacity. In Tier I where network capacities are less than in Tier 3, a greater number of pollers is required. However, as the number of pollers increases, the bandwidth consumed decreases as well. This result further justifies the hierarchical distributed polling architecture when compared to a centralized system.

Figure 10A:
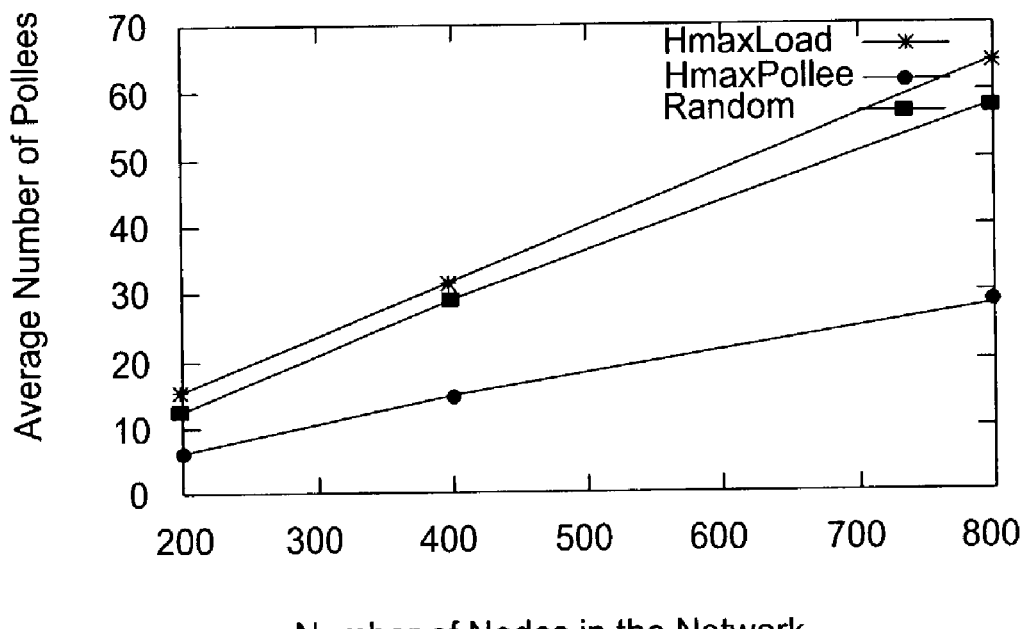
FIGS. 10A and 10B each depict a graph representing a minimum number of pollers as a function of network size.
Figure 10B:
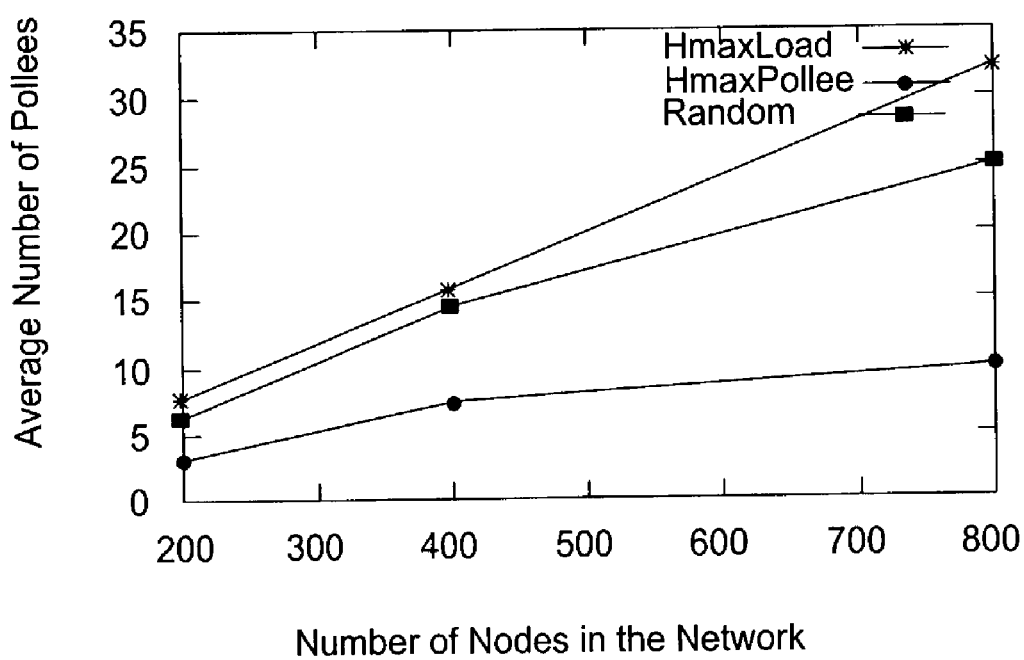

The trend on the number of pollers as a function of network size is shown in FIG. 10. FIGS. 10A and 10B each depict a graph representing a minimum number of pollers as a function of network size. That is, FIGS. 10A and 10B each depict a graph representing average number of pollers versus number of nodes in a network at a particular bandwidth capacity. Referring to FIG. 10A for LINKF=5%, the graph shows that the performance of the MaxPollee heuristic is the best among the three algorithms. That is, the HmaxPollee heuristic 600 scales better than the other two algorithms 300 and 700. The impact of the average degree of connectivity on the performance of the MaxPollee heuristic is presented in Table-7. The average degree of connectivity varies from 3.5 to 8 as β varies from 0.08 to 0.2 for a fixed α of 0.2. Note that the performance of the HMaxPollee heuristic 600 improves as the degree of connectivity increases.

An important goal is to minimize the set of pollers for a given network topology. In order to measure performance of the solution computed by the heuristic algorithms 300, 600 and 700, a comparison may be made from an optimal solution. Since the optimal solution to the Integer Programming formulation of the minPL is NP-hard and cannot be computed in a reasonable time, alternatively a comparison may be made between the heuristic solutions and some lower bound. In one embodiment, the solution from a Linear Programming (LP) relaxation model of the integer programming formulation is used as the lower bound on the optimal solution. Specifically, the LP relaxation gives the lower bound on the number of pollers required for a given topology.

To obtain the lower bound on the bandwidth consumption, an assumption is made that the number of pollers in the network is given. The total bandwidth consumed by the heuristic solution is compared to the minimum possible bandwidth consumption assuming a fixed number of pollers. This problem (referred to as the OptimalPolleeAssignment problem) is also NP-hard. The lower bound on bandwidth consumption is obtained by solving the LP relaxation for the following integer programming problem:

(7) $\text{Minimize} \sum_{e \in E} \sum_{i}^{n} \sum_{j}^{n} \delta_e^{ij} w_i x_{ij};$ subject to:

(8) $\sum_{j=1}^{n} x_{ij} = 1,$ for each $v_i \in V;$ (9) $x_{ij} \leq y_j,$ for each $v_i, v_j \in V;$

(10) $\sum_{i}^{n} \sum_{j}^{n} \delta_e^{ij} w_i x_{ij} \leq b(e)$ for each $e \in E;$

(11) $\sum_{j=1}^{n} y_j \leq k$

(12) $x_i \in \{0,1\},$ for each $v_i, v_j \in V;$

(13) $y_j \in \{0,1\},$ for each $v_j \in V;$ where k is the number of pollers given by the heuristic algorithm selected to compare.

The HmaxPollee algorithm 600 is compared with the LP lower bound, since the HmaxPollee algorithm 600 performs the best among the three heuristics 300, 600, 700. The results presented on the topology gives the worst approximation ratio, where the approximation ratio is defined as the ratio between the number of pollers given by HMaxPollee and the best possible estimate of the lower bound. It is noted that a tie may be broken by using the largest fraction of bandwidth usage. Table-8 of FIG. 9C presents the comparison between our results and those obtained using the LP bound. Note that the second item in the tuple for LP bound is the fraction of bandwidth used given that the number of pollers used is the same as HmaxPollee in the respective cases (not the fraction of bandwidth consumed for the LP relaxation of minPL problem.).

For the 200 node tier 2 network (note, the LP solver cannot solve the 400 node case in reasonable time), the lower bound on the number of pollers is 2 when LINKF=5%, and 1 when LINKF=10%. Given the number of pollers to be 7 and 2 for LINKF=5% and 10%, the lower bound on the fraction of bandwidth used is 0.52% and 1.24% which is very close to the bandwidth fraction (0.7% and 1.62%) required for the Hmax-Poller heuristic.

The LP lower bound for enterprise networks is shown in Table 9 of FIG. 9C. The relative difference between Hmax-Pollee and LP lower bound is similar to that in the case of service provider networks. Referring to Table-9, the LP solution has 1 poller while the HmaxPollee solution has 6 pollers. Note that the optimal number of pollers needed is at least two. The reason is that RestrictedMaxPollee heuristic gives the optimal solution if only one poller is needed. Since the solution obtained from the LP relaxation is 1 and the optimal is at least 2 in this instance, the integrality gap of the minPL problem is at least 2. Integrality gap is defined as the ratio of the optimal solution to the solution obtained using LP relaxation. Based on the low bound on integrality gap and empirical data in Tables 8 and 9, the results are close to the optimal solution by a factor of 4.5 in terms of the number of pollers, and by a factor of two (2) in terms of bandwidth consumed.

An important assumption is that in order to design good measurement in frastructure, it is necessary to have a scalable system at a reduced cost of deployment. The key feature of the hierarchical measurement architecture is to distribute the resource intensive tasks across the network. One such task is the polling of individual nodes. The number and choice of these pollers has a significant impact on the cost of the measurement infrastructure. The cost is due to both the deployment of the instrumentation as well as the bandwidth consumed by the measurement traffic. The simulations shown and discussed with regard to FIGS. 9 and 10 illustrate that it is possible to design such an infrastructure and attain significant reduction in bandwidth overhead as well as in the cost of deployment of the pollers.

The MaxPollee assignment scheme aggressively chooses the next poller with the intent of assigning all of the remaining nodes to the new poller. However, the reduction in the number of pollers comes at the cost of the bandwidth consumed. Further, by increasing the capacity reserved (LINKF parameter) for polling, the number of pollers may be reduced, regardless of the heuristics used. This further highlights the importance of the bandwidth constraint in the formulation of this problem. One other factor that affects the performance of the maxPollee algorithm is the degree of connectivity in the network. for enterprise network with high degree of connectivity, fewer pollers were required as compared to the service provider network (see Table 6 of FIG. 9B).

In the case of the service provider network, as well as the enterprise network, a poller set and a corresponding assignment scheme is easily identified without violating any bandwidth constraints. Only in 6% of the cases was it found necessary to use more than 90% of the allocated bandwidth. Such efficient use of bandwidth is attained by the ShuffleAndReduce algorithm 800, which was performed for every new additional poller chosen. Without the explicit consideration of bandwidth issues, it is highly likely that undesirable bandwidth bottlenecks would be created due to network measurements.

The distributed poller location scheme presented herein may be used in design phase and implementation of a network management system. For a network of about 200 nodes, the poller set and the assignment scheme is attainable in just a few minutes. Thus, with little effort the network operations center can identify the placement of their measurement instrumentation. When choosing pollers, it is assumed that the pollers have sufficient power to handle the polling load for the assigned pollees.

Although various embodiments that incorporate the teachings of the present invention have been shown and described in detail herein, those skilled in the art can readily devise many other varied embodiments that still incorporate these teachings.

What is claimed is:

1. A method of optimizing a distributed polling system in a network comprising a plurality of nodes, comprising:
    identifying bandwidth constraints on polling traffic between each of said plurality of nodes;
    determining, for each of a plurality of unpolled nodes within said plurality of nodes, a number of unpolled nodes assignable to that unpolled node without violating the bandwidth constraints;
    selecting a poller node from said plurality of unpolled nodes according to said numbers of assignable unpolled nodes determined for said respective unpolled nodes; and
    assigning respective unpolled nodes as pollee nodes to said poller node.

2. The method of claim 1, wherein, for each of said unpolled nodes within said plurality of nodes, said determining step comprises:
    a) identifying a routing tree containing a respective unique path from each unpolled node to said unpolled node within said plurality of nodes;
    b) sorting the unpolled nodes in said routing tree by increasing order of polling demand;
    c) selecting a node of the sorted unpolled nodes having a lowest polling demand in said routing tree;
    d) associating said selected node to said unpolled node within said plurality of nodes in an instance where said bandwidth constraints are not violated;
    e) repeating steps (c-d) for each unpolled node in the routing tree in order of increasing demand; and
    f) counting said selected nodes associated with said unpolled node within said plurality of nodes.

3. The method of claim 1, further comprising:
    reassigning said pollee nodes to other poller nodes in instances where overall bandwidth usage is reduced as compared to previous polling assignments.

4. The method of claim 3, wherein said reassigning step comprises:
    a) sorting said pollee nodes in order of decreasing polling demand;
    b) selecting a pollee node having a highest polling demand;
    c) reassigning said selected pollee node to a different poller node if said bandwidth usage is reduced as compared to a previous polling assignment; and
    d) repeating steps (b) and (c) for each sorted pollee node.

5. A method of optimizing a scalable distributed polling system in a network comprising a plurality of nodes, comprising:
    selecting, from a plurality of unpolled nodes within said plurality of nodes, at least one poller node according to respective polling loads associated with said unpolled nodes;
    determining a maximum number of pollee nodes of said plurality of unpolled nodes assignable to said at least one poller node without violating bandwidth constraints; and
    respectively assigning said unpolled pollee nodes to said at least one poller node.

6. The method of claim 5, wherein said selecting step comprises:
    sorting polling loads of each unpolled node in said network by decreasing order; and
    selecting a first poller node having a highest polling load rank.

7. The method of claim 5, further comprising:
    identifying polling traffic bandwidth constraints between each node of said plurality of nodes; and
    identifying a polling load for each node in said network.

8. The method of claim 5, wherein said determining step comprises:
    a) identifying a routing tree containing a unique path from each unpolled node to the at least one poller node;
    b) sorting the unpolled nodes in the routing tree by increasing order of polling load;
    c) selecting a node of the sorted unpolled nodes having a lowest polling load;

d) assigning said selected unpolled node to said poller node as a pollee node in an instance where bandwidth constraints are not violated and rejecting said selected unpolled node in an instance where bandwidth constraints are violated; and e) repeating steps (c) and (d) for each unpolled node in the routing tree.

9. The method of claim 5, further comprising:

reassigning said pollee nodes to other poller nodes in instances where overall bandwidth usage is reduced as compared to previous polling assignments.

10. The method of claim 9, wherein said reassigning step comprises:

a) sorting said pollee nodes in order of decreasing polling load;

b) selecting a pollee node having a highest polling load;

c) reassigning said selected pollee node to a different poller node where said bandwidth usage is reduced as compared to a previous polling assignment; and d) repeating steps (b) and (c) for each sorted pollee node.

11. A method of optimizing a distributed polling system in a network comprising a plurality of nodes, comprising:

identifying bandwidth constraints on polling traffic between each of said plurality of nodes;

identifying, for each of said plurality of nodes, an associated polling load;

selecting, from a plurality of unpolled nodes within said plurality of nodes, at least one poller node according to a random selection; and respectively assigning said unpolled nodes as pollee nodes to said at least one poller node using said polling loads without violating bandwidth constraints.

12. The method of claim 11, wherein said assigning step comprises:

a) identifying a routing tree containing a unique path from each unpolled node to the at least one poller node;

b) sorting the unpolled nodes in the routing tree by increasing order of polling demand;

c) selecting a node of the sorted unpolled nodes having a lowest polling demand;

d) assigning said selected unpolled node to said poller node as a pollee node in an instance where bandwidth constraints are not violated and rejecting said selected unpolled node in an instance where bandwidth constraints are violated; and e) repeating steps (c) and (d) for each unpolled node in the routing tree.

13. The method of claim 11, further comprising:

reassigning said pollee nodes to other poller nodes in instances where overall bandwidth usage is reduced as compared to previous polling assignments.

14. The method of claim 13, wherein said reassigning step comprises:

a) sorting said pollee nodes in order of decreasing polling demand;

b) selecting a pollee node having a highest polling demand;

c) reassigning said selected pollee node to a different poller node where said bandwidth usage is reduced as compared to a previous polling assignment; and d) repeating steps (b) and (c) for each sorted pollee node.

15. A hierarchical distributed polling system for a network comprising a plurality of nodes, comprising:

a central manager for identifying a respective plurality of polling loads for the plurality of nodes of the network;

a plurality of pollee nodes coupled to at least one poller node via at least one routing path, wherein said pollee nodes are assigned to said at least one poller node using the polling loads without violating bandwidth constraints; and at least one aggregating node coupled to said at least one poller node and said central manager;

wherein said at least one poller node is selected from said plurality of nodes based on at least one of: a highest demand load of said plurality of nodes, a maximum number of assignable pollee nodes without violating bandwidth constraints, and a random selection.

* * * * *